US009875273B2

(12) United States Patent
Eberlein et al.

(10) Patent No.: US 9,875,273 B2
(45) Date of Patent: Jan. 23, 2018

(54) METHODS AND SYSTEMS FOR MANAGING CONFIGURATION SETTINGS

(71) Applicant: SAP SE, Walldorf (DE)

(72) Inventors: Peter Eberlein, Malsch (DE); Alexander Rieder, Herxheim (DE); Florian Mueller, Nussloch (DE)

(73) Assignee: SAP SE, Walldorf (DE)

( * ) Notice: Subject to any disclaimer, the term of this patent is extended or adjusted under 35 U.S.C. 154(b) by 78 days.

(21) Appl. No.: 14/169,926

(22) Filed: Jan. 31, 2014

(65) Prior Publication Data

US 2015/0220591 A1    Aug. 6, 2015

(51) Int. Cl.
G06F 17/30    (2006.01)

(52) U.S. Cl.
CPC .. *G06F 17/30386* (2013.01); *G06F 17/30312* (2013.01)

(58) Field of Classification Search
CPC ............... G06F 17/30312; G06F 17/30386
See application file for complete search history.

(56) References Cited

U.S. PATENT DOCUMENTS

| | | | | |
|---|---|---|---|---|
| 6,691,165 B1 * | 2/2004 | Bruck | ............... | H04L 29/12009 709/227 |
| 2002/0032758 A1 * | 3/2002 | Yen | ............... | H04L 67/42 709/220 |
| 2002/0035595 A1 * | 3/2002 | Yen | ............... | G06F 9/4443 709/203 |
| 2002/0107911 A1 * | 8/2002 | Lipton | ............... | G06F 17/30864 709/203 |
| 2004/0044753 A1 * | 3/2004 | Toyoshima | ............... | H04L 41/0253 709/223 |
| 2005/0097114 A1 * | 5/2005 | Carro | ............... | G06F 17/30067 |
| 2008/0270740 A1 * | 10/2008 | Wang | ............... | G06F 9/45537 711/206 |
| 2009/0124198 A1 * | 5/2009 | Huynh | ............... | H04W 48/02 455/26.1 |
| 2010/0257149 A1 * | 10/2010 | Cognigni | ............... | G06F 17/30575 707/698 |
| 2013/0047139 A1 * | 2/2013 | Bolton | ............... | G06F 9/44505 717/121 |
| 2014/0181262 A1 * | 6/2014 | Goswami | ............... | H04L 67/02 709/219 |
| 2015/0007332 A1 * | 1/2015 | Satish | ............... | G06F 8/60 726/25 |

* cited by examiner

*Primary Examiner* — Rehana Perveen
*Assistant Examiner* — Huen Wong
(74) *Attorney, Agent, or Firm* — Jones Day (57) ABSTRACT

A method for receiving configuration data for a client from a data repository may include sending a request for information pertaining to data stored in the data repository and receiving the data repository information. The method may include identifying a settings repository from the data repository information and requesting configuration data for the client from the identified settings repository. The configuration data may be received from the data repository and stored at the client. The settings at the client may be applied based on the received configuration data.

19 Claims, 5 Drawing Sheets

METHODS AND SYSTEMS FOR MANAGING CONFIGURATION SETTINGS

RELATED APPLICATIONS

This application is related to U.S. Patent Application No., "Restricting User Actions Based on Document Classification," filed on Jan. 31, 2014, the entirety of which is incorporated by reference herein.

FIELD

The present disclosure relates generally to managing configuration settings. More particularly, the present disclosure relates to systems and methods for providing configuration settings to clients accessing data from a data repository.

BACKGROUND

With advances in the mobile technology, corporations are expanding their use of mobile clients. The mobile clients include, for example, desktop clients, web clients, iPhone/iPad clients and Android clients. The clients include applications configured to perform specific operations. The applications include receiving and sending data to a document management system that manages corporate data. The document management system provides a central interface for clients to share documents with a central database and other clients. These systems also provide for mechanisms to store documents and track changes being made to the documents.

As the needs of the corporations change, the clients may need to be updated or reconfigured based on these changes. For example, an application on the client may need to be upgraded in order for the client to be able to view a new file format used for the corporate documents. The application can be updated by an administrator manually updating the application on the client. The administrator may also send a notification to the client for the application to be updated by the user. However, with the large number of clients, different locations of mobile clients, and constant updates, it is difficult for all of the clients to be constantly kept up to date with the correct configurations.

BRIEF DESCRIPTION OF THE DRAWINGS

The accompanying drawings illustrate the various embodiments and, together with the description, further serve to explain the principles of the embodiments and to enable one skilled in the pertinent art to make and use the embodiments.

DETAILED DESCRIPTION

Embodiments of the present disclosure may include a system and method for generating and providing configuration data to clients requesting data from a data storage device. In one embodiment, the method for receiving configuration data for a client from a data repository may include sending a request for information pertaining to data stored in the data repository and receiving the data repository information. The method may also include identifying a settings repository from the data repository information and requesting configuration data for the client from the identified settings repository. The configuration data may be received from the data repository and stored at the client. The settings at the client may be applied based on the received configuration data. The configuration data may include a configuration document including at least a portion of the settings for the client(s).

The embodiment of the present disclosure allow for the configuration to be defined and sent to a client using existing communication services. For example, an existing communication service that is used to transfer documents between clients and central data storage may provide for client settings to be sent from the data storage to the clients. An administrator may provide the settings in a document designated as a settings document. The client may identify the settings document and use data in the settings document to configure the client or applications on the client. The settings document may provide settings for all types of clients and is not limited to specific versions of applications or operating systems. Administrators may easily update the setting files stored on the data storage using existing text editors. The administrators may also provide additional content in designated settings folders on the data storage.

Figure 1:
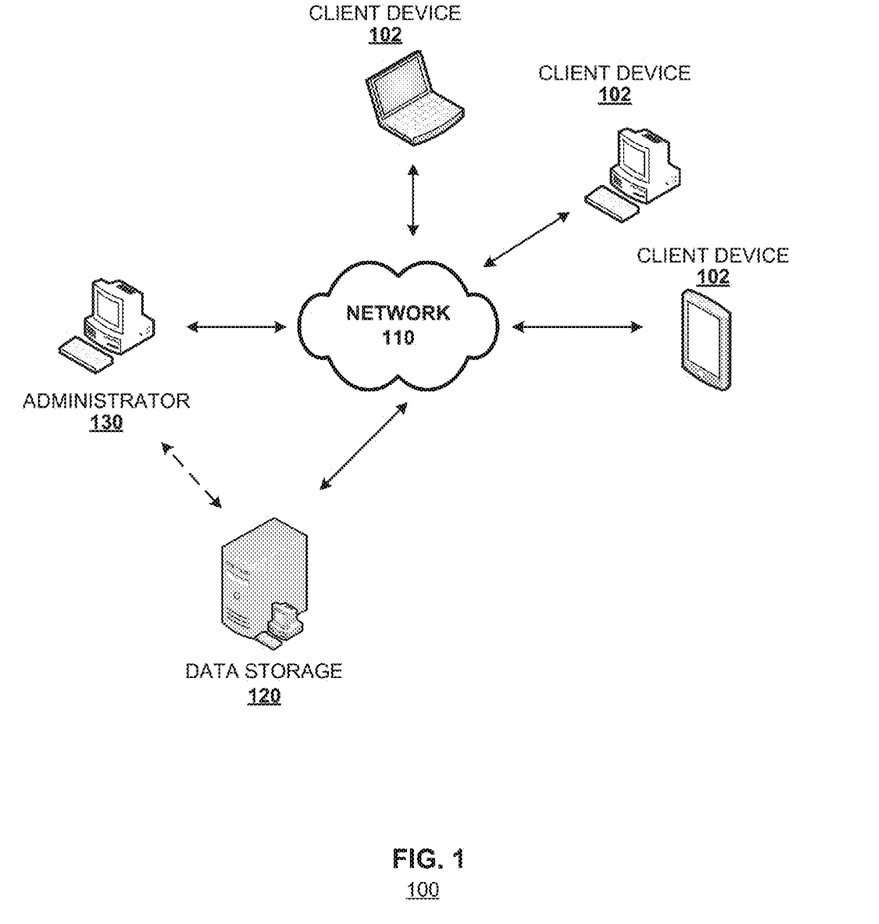
FIG. 1 is a block diagram illustrating a networked environment according to an embodiment of the present disclosure.

FIG. 1 is a block diagram illustrating a networked environment 100 according to an embodiment of the present disclosure. The networked environment 100 may include a plurality of client devices 102 communicably coupled via a network 110 to a data storage device 120. An administrator device 130 may connect to the data storage device 120 directly or via the network 110.

The data storage device 120 stores data that may be requested by the client devices 102. In one embodiment, the data storage device 120 may be a dedicated server, a content management system and/or a document management system that tracks and stores electronic documents. The data storage device 120 may track different versions of a document and track modifications performed by various users and/or client devices 102. The storage device 120 may store different types of documents and metadata associated with the documents. The data storage device 120 may modify the metadata based on operations performed on the respective document (e.g., modifications to the document) or based on operations performed in association with the document (e.g., request to send a copy of the document).

The data storage device 120 may receive the documents from the client devices 102, the administrator device 130 or from other devices coupled to the data storage device via the network 110 or directly. The data storage device 120 may request data from other devices based on requests by the client devices 102. In one embodiment, the data storage device 120 may include applications to create and/or edit the data stored on the data storage device 120.

The client devices 102 may include applications that access the data stored by the data storage device 120. The applications may be web browsers, desktop applications or mobile applications. Web-based applications that are executed on the client devices may be provided via the network 110 by a server associated with the data storage device. In one embodiment, a portion or all of documents stored on the client device 102 may be synchronized with the corresponding documents stored on the data storage device 120. Thus, any changes to the document on the client device may be reflected in the copy stored on the data storage device 120. Similarly, any changes to the document stored on the data storage device 120 may be reflected in the copy stored on the one or more client devices 102. In another embodiment, the client device (e.g., in a web based application) may access data from the storage device 120 on demand.

The data storage device 120 may store configuration data for the client devices 102 and/or the applications operating on the client devices 102. The configuration data may include administrative settings, user settings, security relevant settings, and theming content (e.g., corporate logos, template or configurations). The configuration data may include, for example, text files, documents, images, videos and executable files. The administrator 130 or one of the client devices 102 may create and update the configuration data. Permission settings may determine whether the administrator 130, one of the client devices 102, or other devices can make changes to the configuration data.

In one embodiment, at least a portion of the configuration data for the client 102 may be provided as a document file. The document file with the configuration data may be synced to the client(s) just like other documents (e.g., business documents) stored in the data storage device 120. The same synchronization logic and/or the same application programming interface may be used to synchronize the document file including the configuration data. Thus, the networked environment 100 does not need have dedicated synchronization logic and/or dedicated application programming interfaces to provide and update the configuration data.

The network 110 may be an internal network, an external network or a plurality of different interconnected networks which may include the Internet. In one embodiment, the client devices 102 may connect to the data storage device 120 via an external network and the administrator 130 may connect to the data storage device 120 via an internal network.

The client device 102 may include, for example, a mobile device (e.g., mobile phone or a smart phone), a personal computer, a tablet, a terminal device, or a personal digital assistant (PDA). The client device 102 includes a processor, a database, an interface, one or more applications (e.g., mobile application), a display, and a graphical user interface (GUI) that can be presented on the display. The display may be any output hardware for presenting information on the client device 102. In one embodiment, the information may be presented on the display through the GUI. The GUI may represent any graphical user interface, including but not limited to, a web browser, touch screen, or command line interface (CLI) that processes information and efficiently presents the information results to the user.

The client device 102 may include an input device (e.g., a touch screen, a touch pad, a mouse or a keyboard) to receive commands from the user. In one embodiment, the client device 102 may be a terminal that displays information provided by the data storage device 120. The data storage device 120 may send applications to be executed by the client device and/or send information to be displayed on the client devices 102 in response to commands issued at the client device 102.

Figure 2:
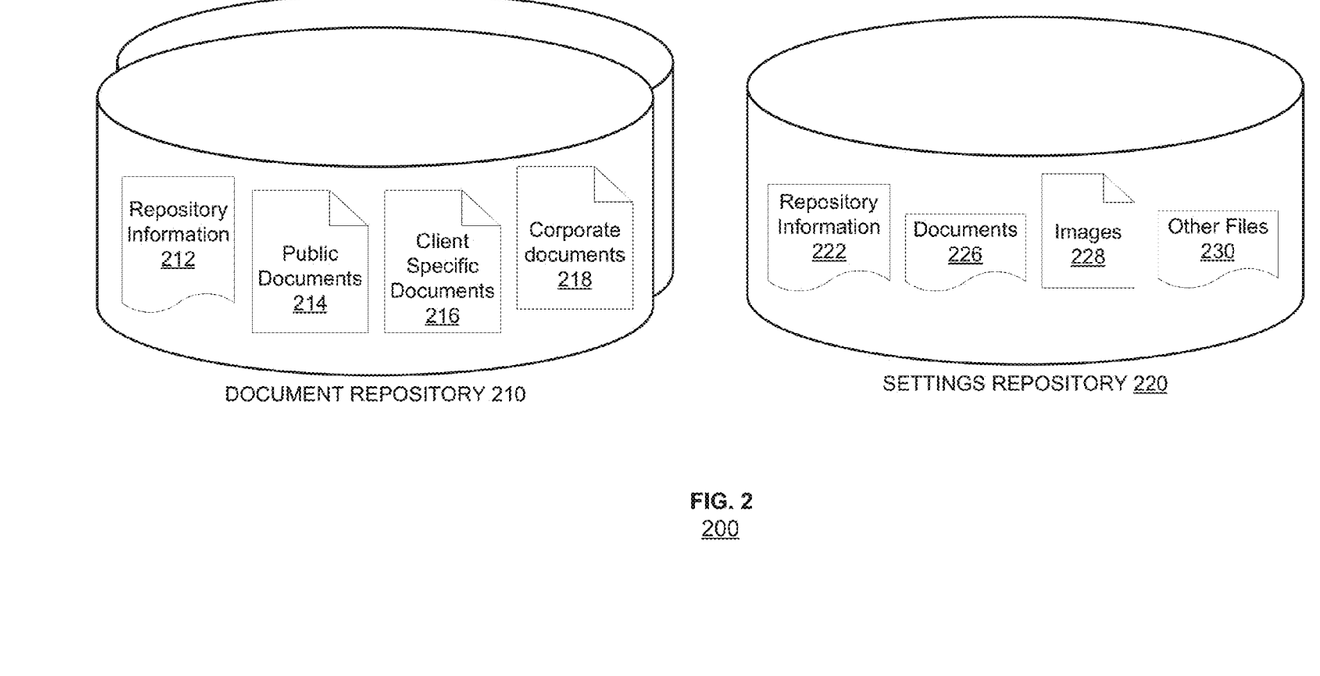
FIG. 2 illustrates a data management system according to an embodiment of the present disclosure.

FIG. 2 illustrates a data management system 200 according to an embodiment of the present disclosure. The data management system may correspond to the data storage device 120 shown in FIG. 1. The data management system 200 may include a plurality of repositories 210, 220. The repositories 210, 220 may be root entities under which documents are organized in folder structures.

Each repository 210, 220 may be dedicated for a particular data type, application and/or group of users or devices. Each repository 210, 220 may be a different storage device managed by the data management system. In another embodiment, a plurality of repositories 210, 220 may all be parts of a single storage device. The repositories 210, 220 may merge data from different sources (e.g., client devices 102) without data replication.

Each repository 210, 220 may include repository information 212, 222, respectively. The repository information 212, 222 may include details about the repository. The repository information 212, 222 may include, for example, the repository identification, repository location (e.g., on the network or the World Wide Web), types of files stored, and information on the files stored in the repository. The information on the files stored in the repository may include list of the files, their locations, request history, and history of changes.

As shown in FIG. 2, the document repository 210 may include public documents 214, client specific documents 216 and corporate documents 218. The public documents 214 may include documents that can be accessed by anyone having access to the document repository. The public documents 214 may include documents that can be downloaded by a user via a public webpage. The client specific documents 216 may include documents that belong to or were generated by a specific user and/or a specific client device. The corporate documents 218 may include documents that can be accessed and manipulated by users and/or client devices that are part of the company.

As shown in FIG. 2, one of the managed repositories may include a settings repository 220. The settings repository 220 may provide data to configure applications and/or client devices accessing data in the data management system 200. The files in the settings repository 220 may allow for the applications and the devices to automatically be configured using the data in the settings repository 220. The configuration data may include data that is specific for the client device, an application, version of the application, and/or a user associated with the application or client device. The configuration data may be provided as one or more text documents that can be viewed and/or edited with any number of text viewers or editors.

The settings repository 220 may include documents 226, images 228 and other files 230. These files may provide the configuration data to apply administrative settings, user settings, security relevant settings, and theming content (e.g., corporate logos, template or configurations). In one embodiment, a single settings document 226 may provide the configuration settings for various applications or the devices. The settings document 226 may provide details for other files to be used in the configuration of the application or the device. For example, the settings document may provide the name and location of files for corporate logos or templates.

In one embodiment, a different settings document 226 may be provided for each different type of device or application accessing the settings repository 220. For example, a first settings document may provide the settings for mobile operating systems, a second settings document may provide the settings for desktop client settings, and a third settings document may provide the settings for web clients. Each client may request a document with the settings corresponding to the type of device requesting the settings document.

Each of the settings documents may include general settings, security settings, security policies, and theme settings.

The general setting may provide application or device requirements and basic settings for these devices. For example, the general settings may include the minimum version (e.g., client version, application version or operating system version), recommended version, cache size, support log setting, support E-mail settings, synchronization interval, and bandwidth settings.

The minimum version may be provided as a text filed with the version string. A client with a lower version than the minimum version may require for the user to upgrade to at least the minimum version in order to run the application or access the data on the data management system 200. The recommended version may include a text filed with the version string. A client with a lower version than the recommended version may be notified with a recommendation to upgrade the client version to the recommended version.

The cache size may include a minimum and/or a maximum cache size to be implemented on the client. The administrator may set these settings based on the requirements of the data management system 200, the client device, the application, or files that are to be viewed or executed at the client device. The maximum cache size may provide the maximum size that the user may set on the client device. For example, the maximum cache size may be set to 50 MB, 100 MB, 1000 MB, or 5000 MB. In one embodiment, the maximum cache size may not be set so that there is no limit. To disable caching, the maximum cache size may be set to zero. The minimum cache size may provide a minimum cache size that is needed on the client device. The user may set the cache size to a higher value but may need to provide at least the minimum cache size.

The support log settings may include whether the support log is disabled or not. If the support log is disabled the user may not activate the support log on the client device. The defaults setting for the support log settings may be set to being enabled.

The support e-mail settings may include an e-mail address to which to send support requests. The support e-mail settings may be used by an application to provide an option to send a support request to the data management system 200 or an administrator. When the support log setting is enabled to provide a support log, the support log may be included with the support request.

The synchronization interval may provide a minimum time interval that should be used between synchronization of the documents in the data management system 200 and the client device (e.g., in the memory or cache of the client device). An option may be provided for the user to set the time interval to a larger, but not smaller, synchronization interval. This setting may be applied to, for example, desktop client settings which may be continuously connected to the data management system 200.

The bandwidth settings may include a maximum and/or a minimum bandwidth setting between the client device and the data management system 200. For example, the maximum bandwidth may be set based on the available bandwidth and the number of clients that are expected to connect to the data management system 200. The user may be provided with an option to set a bandwidth that is lower but not higher than the maximum bandwidth. Like other settings, the bandwidth settings may be set based on the type of device (e.g., mobile device, desktop client or web client) and/or the type of application that is accessing the data management system 200.

The security settings may include settings for the password of the client device and/or application. The security settings may include whether an application password is required. If the password is not required the user may still set an application password but it will not be required. The security settings may include a lock timeout setting set to a predetermined time period (e.g., 0, 60, 300 or 600 seconds). The lock timeout setting may provide for how long the password does not have to be re-entered if the application is in the background for the predetermined time period. The user of the client device may set the value to a smaller value but not to a longer period. The security settings may also include a maximum number of failed password attempts, minimum password length, requirement for password to include a lowercase character, requirement for the password to include an uppercase character, requirement for the password to include a digit, and the password to include a special character.

The security policy settings may include a security policy for documents or folders based on the document or folder classification. The classifications may include strictly confidential, confidential, internal, customer, and public designations. The security policy may allow or restrict specific actions within the application on the documents or folders based on the classifications. The security policy may include whether the document classification visible to the user, whether document can be opened (e.g., downloaded and displayed) on the client device, whether the document can be cached for offline use, whether the document can be printed, whether the document or a portion of the document can be copied, whether the document can be sent in an e-mail, whether the document can be externally shared, and whether the document can be opened in other applications on the client device.

The theme settings may include themes or templates of the company that can be applied to the client device. The theme settings may include links to data on the data management system 200. For example, the theme setting may include a link to an image that should be used as the company logo in the application. Other examples of the theme setting may include colors, fonts and background images to be used in the applications and/or the client device.

Figure 3:
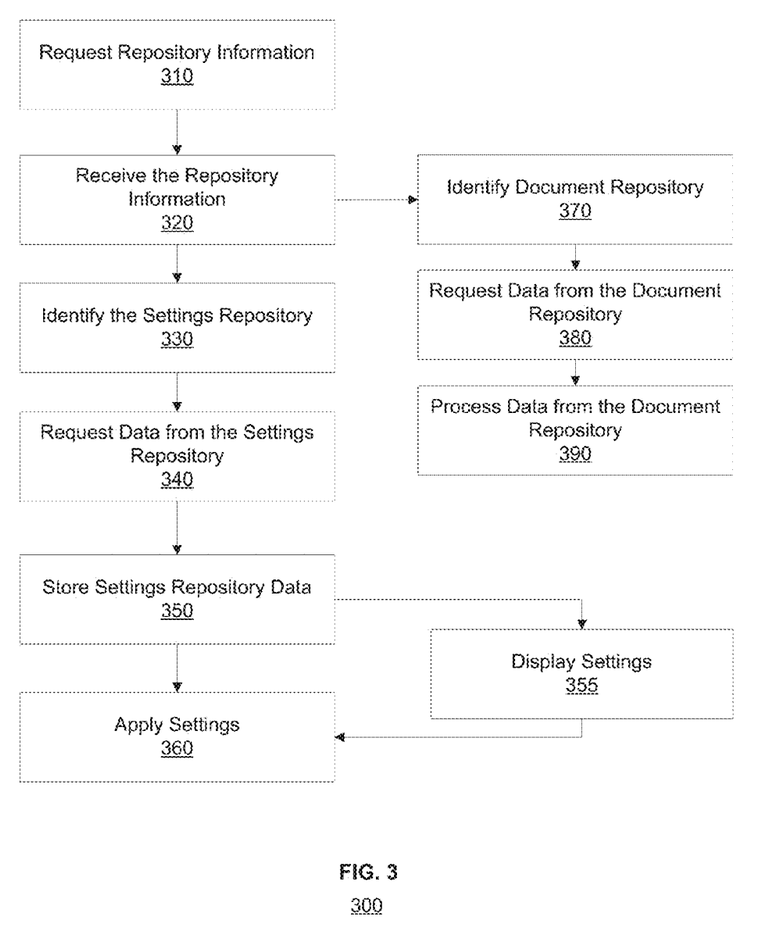
FIG. 3 illustrates a method for receiving configuration data for a client according to an embodiment of the present disclosure.

FIG. 3 illustrates a method 300 for receiving configuration data for a client according to an embodiment of the present disclosure. The method may be performed by one of the client devices 102, shown in FIG. 1. The method 300 may include requesting repository information (block 310), receiving repository information (block 320), identifying the settings repository (block 330), requesting data from the settings repository (block 340), storing settings repository data (block 350), and applying the settings (block 360).

Requesting repository information (block 310) may include sending a request by the client to a data storage device. The request may be sent in response to a user request or in response to an operation performed on the client device. For example, the request may be sent automatically when a user logs into the client device or application, when an application is started, or when a request for data is sent to the storage device. In one embodiment, the request may be sent periodically (e.g., once a day) to the data storage device. The request may include information on the client device, application, and/or the user making the request. In one embodiment, the request may include a user ID and password. The request may also include client security policy identifying the level of access the user may have to the data in the data storage device.

In response to the request, the client may receive the repository information (block 320). The repository information may be sent by the data storage device and may include details on the data that is stored in the data storage device. This data may include a listing of the repositories and the data that is stored in each repository. In one embodiment, the data may include a file directly of the data storage device. The repository information received from the data storage device may include only information for repositories to which the client has authorization to access.

In one embodiment, the repository information may be automatically received from the data storage device without needing a request. In this embodiment, the repository information may be sent periodically to the client devices which have been confirmed to have authorization to receive the repository information.

Identifying the settings repository (block 330) may include analyzing the received repository information to determine if the data storage device includes a setting repository. If a settings repository is included in the received repository information, a request may be sent for data from the settings repository (block 340). The setting repository information may be identified by searching for the settings extension in the extension elements of the repository information. The repository information may provide the settings folder ID which may server as the anchor point into the settings folder structure in the settings repository. In one embodiment, the client may identify the settings repository and a settings document or folder that is specific to the type of client requesting the settings data.

Requesting data from the settings repository (block 340), may include requesting a settings document (e.g., settings document 226 discussed shown in FIG. 2). The request may include requesting data (e.g., a settings document) that is specific to the client and/or applications on the client. The settings document may provide configuration settings for the client and/or the applications on the client.

Based on the data in the settings document, additional data (e.g., images and other files) may be requested from the settings repository and/or the document repository. For example, based on the information in the settings document the client may determine which image the client needs to download from the settings repository and use as the logo in an application. The client applications may use regular data management service to navigate and retrieve data the folder structure of the settings repository.

The received settings repository data may be stored (block 350) on the client. In one embodiment, the settings repository data may be stored in memory on the client to keep a synced copy of the settings repository data. In another embodiment, the settings repository data may be stored in cache of the client to determine and apply the configurations provided in the settings repository data.

In one embodiment, requesting data from the settings repository (block 340) may include requesting all of the content in the settings repository. The settings repository content may be stored (block 350) in memory of the client. This embodiment may be applicable to clients (e.g., desktop application or mobile application) which keep the data repository content in sync with the data storage device. The client may use the settings data stored on the client even when the client device cannot connect to the data storage device (e.g., when client is offline).

In one embodiment, the client may request (block 340) data from the settings repository on demand (e.g., web applications). The client may access the configuration data by name using regular data management system service. The document names relevant for the individual client may be included in the respective client application or referenced by other settings documents. The data requested on demand may be stored (block 350) temporarily in the client cache.

The settings repository data may be displayed to the client (block 355). For example, when the settings repository data is received, the client may be notified of settings that do not conform to the current settings and provide recommended and/or required actions. The client may also view the settings document using a text viewing or editing application.

The method 300 may include applying the settings (block 360) based on configuration data in the settings repository. The settings may be applied to the client as soon as the document with the settings is synced to the client. For example, an application on the client may be upgraded to the recommended application version when a document is received identifying the recommended application version. In one embodiment, the client may download and apply a background image on the client an image which is identified in the settings document.

As shown in FIG. 3, the method 300 may also include identifying a document repository (block 370), requesting data from the document repository (block 380), and processing data from the document repository (block 390). Identifying the document repository (block 370) may include identifying data repositories in the data storage device which can be accessed by the client. The document repository may include data that is synched with the data on the client. Data from the document repository may be requested (block 380) and synched (block 390) with the data on the client. The data from the document repository may be processed (e.g., modified analyzed) by applications on the client.

Figure 4:
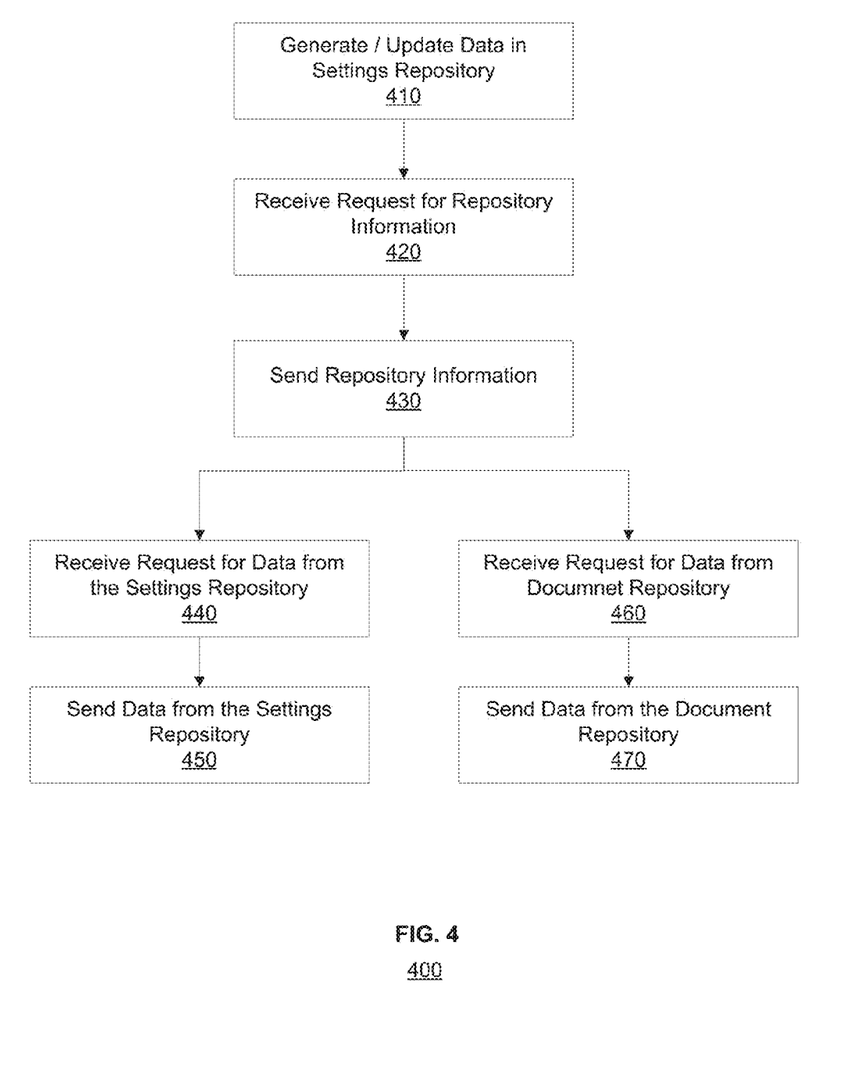
FIG. 4 illustrates a method for providing configuration data on a data management system according to an embodiment of the present disclosure.

FIG. 4 illustrates a method 400 for providing configuration data on a data management system according to an embodiment of the present disclosure. The method may be performed by the data storage device 120, shown in FIG. 1. The method 400 may include generating or updating data in the settings repository (block 410), receiving request for repository information (block 420), sending repository information (block 430), receiving request for data from the settings repository (block 440), and sending data from the settings repository (block 450). The method 400 may also include receiving request for data from a document repository (block 460) and sending data from the document repository (block 470).

Generating and/or updating data in the settings repository (block 410) may include a user providing configuration data for a client in a settings document. In one embodiment, a separate settings document may be provided for each type of client or application. In another embodiment, a single settings document may be provided for different client or applications. The settings document(s) may be stored in a data storage device. The data storage device may include a plurality of repositories including document repositories and a settings repository. The settings document(s) may be stored in the settings repository of the data storage device.

The settings document may be created or edited using regular document operations provided by the data storage device storing the settings document. In one example, an administrator may open the settings document in a text editor and add settings items in the document. The settings may be provided as name-value pairs. The name-value pairs may provide for settings to be defined without breaking existing settings. It also may not be required to provide a dedicated user interface on the server side to maintain the settings document.

In other embodiments, the data in the settings repository may be configured via a user interface. The user interface may allow for the user to be presented with settings options and to receive settings from the user. In one embodiment, a hybrid administration strategy may be provided in which an administrator user interface is provided to edit currently defined setting and the additional settings may be included with a text editor. In this embodiment, the text editor may be used to edit the settings for values that the user interface has not been configured to handle (e.g., due to an outdated version of the user interface). Once the user interface is update, there may be no need to use the text editor to set the settings in the settings document.

In addition to the settings document, other files (e.g., images, documents and videos) that are associated with the configuration of the clients may be stored in the settings repository (e.g., in a folder containing the settings document).

Receiving a request for repository information (block 420) may include receiving a request from one or more clients. The request may include information on the client device, application, and/or the user making the request. In one embodiment, the request may include a user ID and password. The request may also include client security policy identifying the level of access the user may have to the data in the data storage device.

In response to the request (block 420), the method 400 may include sending the repository information (block 430). The repository information may include details on the data that is stored in the data storage device. This data may include a listing of the repositories (e.g., document repositories and settings repository) and the data that is stored in each repository. In one embodiment, the repository information received from the data storage device may include only information for repositories to which the client has authorization to access.

Receiving request for data from the settings repository (block 440) may include receiving a request from the client for a setting document stored in the settings repository. In one embodiment, the request may include receiving all of the data stored in the settings repository or all of the data in the settings repository to which the client has access.

In response to the request (block 440), the method 400 may include sending data from the settings repository (block 450). Depending on the request, the sent data may include a single file or a predetermined content of the settings repository. The predetermined content of the settings repository may include a specific folder in the settings repository or content to which the client has authority to access.

In one embodiment, the data from the settings repository may be sent periodically to the client to keep an updated copy of the settings with the client. In another embodiment, the data from the repository may be sent to the client every time changes are made to the data in the settings repository. The data that is sent to the client may include only the changes (e.g., deltas) in the settings data. In this embodiment, the data sent to the client may include the settings document and files which have been modified or changed.

Receiving request for data from the document repository (block 460) may include receiving a request from the client for data stored in document repository of the data storage device. The request may be received periodically or when the user of the client makes the request.

In response to the request (block 460), the method may send the requested data from the document repository (block 470) to the client. The data from the document repository may be sent periodically to the client to keep an updated copy of the data at the client. In another embodiment, the data from the repository may be sent to the client every time changes are made to the data in the document repository (e.g., changes made by other clients).

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

Figure 5:
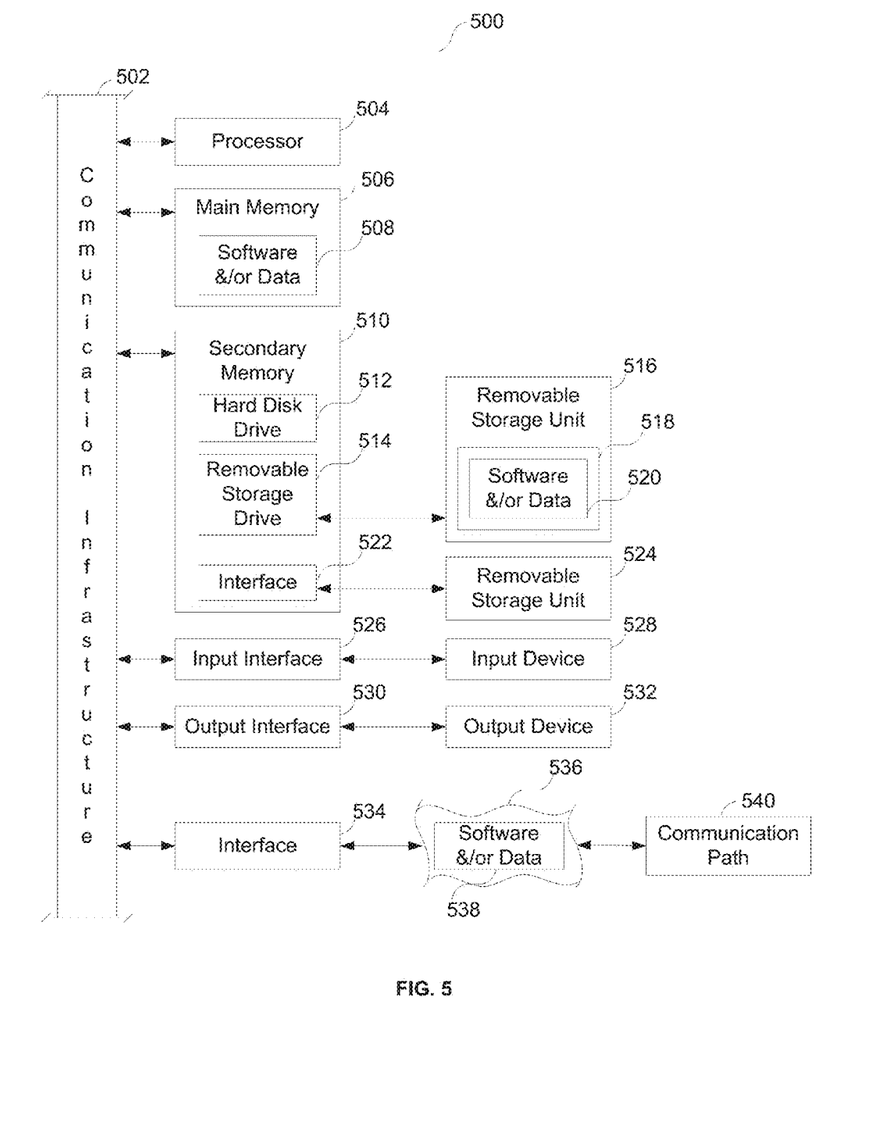
FIG. 5 illustrates an example computer system in which one or more embodiments of the present disclosure may be implemented as computer-readable code.

Aspects of the above may be implemented by software, firmware, hardware, or any combination thereof. FIG. 5 illustrates an example computer system 500 in which the above, or portions thereof, may be implemented as computer-readable code. Various embodiments of the above are described in terms of this example computer system 500.

Computer system 500 includes one or more processors, such as processor 504. Processor 504 can be a special purpose processor or a general purpose processor. Processor 504 is connected to a communication infrastructure 502 (for example, a bus or a network).

Computer system 500 also includes a main memory 506, preferably Random Access Memory (RAM), containing possibly inter alia computer software and/or data 508.

Computer system 500 may also include a secondary memory 510. Secondary memory 510 may include, for example, a hard disk drive 512, a removable storage drive 514, a memory stick, etc. A removable storage drive 514 may comprise a floppy disk drive, a magnetic tape drive, an optical disk drive, a flash memory, or the like. A removable storage drive 514 reads from and/or writes to a removable storage unit 516 in a well-known manner. A removable storage unit 516 may comprise a floppy disk, magnetic tape, optical disk, etc. which is read by and written to by removable storage drive 514. As will be appreciated by persons skilled in the relevant art(s) removable storage unit 516 includes a computer usable storage medium 518 having stored therein possibly inter alia computer software and/or data 520.

In alternative implementations, secondary memory 510 may include other similar means for allowing computer programs or other instructions to be loaded into computer system 500. Such means may include, for example, a removable storage unit 524 and an interface 522. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 524 and interfaces 522 which allow software and data to be transferred from the removable storage unit 524 to computer system 500.

Computer system 500 may also include an input interface 526 and a range of input devices 528 such as, possibly inter alia, a keyboard, a mouse, etc.

Computer system 500 may also include an output interface 530 and a range of output devices 532 such as, possibly inter alia, a display, one or more speakers, etc.

Computer system 500 may also include a communications interface 534. Communications interface 534 allows software and/or data 538 to be transferred between computer system 500 and external devices. Communications interface 534 may include a modem, a network interface (such as an Ethernet card), a communications port, a Personal Computer Memory Card International Association (PCMCIA) slot and card, or the like. Software and/or data 538 transferred via communications interface 534 are in the form of signals 536 which may be electronic, electromagnetic, optical, or other signals capable of being received by communications interface 534. These signals 536 are provided to communications interface 534 via a communications path 540. Communications path 540 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 516, removable storage unit 524, and a hard disk installed in hard disk drive 512. Signals carried over communications path 540 can also embody the logic described herein. Computer program medium and computer usable medium can also refer to memories, such as main memory 506 and secondary memory 510, which can be memory semiconductors (e.g. Dynamic Random Access Memory (DRAM) elements, etc.). These computer program products are means for providing software to computer system 500.

Computer programs (also called computer control logic) are stored in main memory 506 and/or secondary memory 510. Computer programs may also be received via communications interface 534. Such computer programs, when executed, enable computer system 500 to implement the present disclosure as discussed herein. In particular, the computer programs, when executed, enable processor 504 to implement the processes of aspects of the above. Accordingly, such computer programs represent controllers of the computer system 500. Where the disclosure is implemented using software, the software may be stored in a computer program product and loaded into computer system 500 using removable storage drive 514, interface 522, hard drive 512 or communications interface 534.

The disclosure is also directed to computer program products comprising software stored on any computer useable medium. Such software, when executed in one or more data processing devices, causes data processing device(s) to operate as described herein. Embodiments of the disclosure employ any computer useable or readable medium, known now or in the future.

Examples of computer readable storage media include, but are not limited to: primary and/or secondary devices, magnetic media, such as hard disks, floppy disks, Zip disks, tapes, and magnetic tape; optical media such as Compact Disc Read-Only Memory (CD-ROM) disks, DVDs and holographic devices; magneto-optical media; and hardware devices that are specially configured to store and execute, such as application-specific integrated circuits ("ASICs"), programmable logic devices ("PLDs") and ROM and RAM devices, Microelectromechanical Systems (MEMS), nano-technological storage device, etc.), and communication mediums (e.g., wired and wireless communications networks, local area networks, wide area networks, intranets, etc.). Examples of computer readable instructions include machine code, such as produced by a compiler, and files containing higher-level code that are executed by a computer using an interpreter. For example, an embodiment of the disclosure may be implemented using Java, C++, or other object-oriented programming language and development tools. Another embodiment of the disclosure may be implemented in hard-wired circuitry in place of, or in combination with machine readable software instructions.

It is important to note that the particulars of FIG. 5 (such as for example the specific components that are presented, the component arrangement that is depicted, etc.) are illustrative only and it will be readily apparent to one of ordinary skill in the relevant art that numerous alternatives (including inter alia other or different components, alternative arrangements, etc.) are easily possible.

A data provider may be an information resource. A data provider may include sources of data that enable data storage and retrieval. A data provider may include databases, such as, relational, transactional, hierarchical, multi-dimensional (e.g., Online Analytic Processing—OLAP), object oriented databases, and the like. Further, a data provider may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., Enterprise resource planning system), and the like. These data providers can include associated data foundations, semantic layers, management systems, security systems and so on. The data from the data provider may be exposed via the Open Data Protocol (OData).

A semantic layer is an abstraction overlying one or more data sources. It removes the need for a user to master the various subtleties of existing query languages when writing queries. The provided abstraction includes metadata description of the data sources. The metadata can include terms meaningful for a user in place of the logical or physical descriptions used by the data source. For example, common business terms in place of table and column names. These terms can be localized and or domain specific. The layer may include logic associated with the underlying data allowing it to automatically formulate queries for execution against the underlying data sources. The logic includes connection to, structure for, and aspects of the data sources. Some semantic layers can be published, so that they can be shared by many clients and users. Some semantic layers implement security at a granularity corresponding to the underlying data sources' structure or at the semantic layer. The specific forms of semantic layers includes data model objects that describe the underlying data source and define dimensions, attributes and measures with the underlying data. The objects can represent relationships between dimension members, provides calculations associated with the underlying data.

In the above description, numerous specific details are set forth to provide a thorough understanding of embodiments of the disclosure. One skilled in the relevant art will recognize, however, that the various embodiments can be practiced without one or more of the specific details or with other methods, components, techniques, etc. In other instances, well-known operations or structures are not shown or described in detail to avoid obscuring aspects of the disclosure.

For simplicity of exposition, the term 'database' was employed in aspects of the above discussion. It will be readily apparent to one of ordinary skill in the art that in the context of the above discussion the scope of that term is not limited just to, for example, a database management system but rather encompasses inter alia any data source, data model, etc.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present disclosure. Moreover, it will be appreciated that the processes may be implemented in association with the apparatus and systems illustrated and described herein as well as in association with other systems not illustrated.

The above descriptions and illustrations of embodiments of the disclosure, including what is described in the Abstract, is not intended to be exhaustive or to limit the embodiments to the precise forms disclosed. While specific embodiments of, and examples for, the embodiments are described herein for illustrative purposes, various equivalent modifications are possible within the scope of the disclosure, as those skilled in the relevant art will recognize. These modifications can be made to the embodiments in light of the above detailed description.

What is claimed is:

1. A method for receiving configuration data for a client from a data repository, the method comprising:
    sending a request for information to determine if there are repositories present on a data storage device, wherein the data storage device is a document management system that manages corporate data and tracks and stores electronic documents;
    receiving the data repository information;
    determining which repository is a settings repository dedicated to providing settings data;
    displaying the settings data in the settings repository to the client;
    requesting a configuration document for the client from the settings repository, the configuration document comprising settings for the client;
    receiving the configuration document from the settings repository for the client, wherein the configuration document includes a minimum version and a recommended version;
    storing the received configuration document at the client;
    applying the settings defined in the configuration document at the client;
    comparing the version of the client with a version of the received configuration file;
    requiring the client, if the client has a lower version than the minimum version, to upgrade the client version to at least the minimum version;
    notifying the client, if the client has a lower version than the recommended version, with a recommendation to upgrade the client versions to the recommended version;
    wherein the client is one of the following types: mobile operating system, desktop client, and web client, and wherein each type of the client is associated with a different configuration file,
    wherein requesting the configuration document from the identified settings repository includes:
        identifying a settings document from a plurality of settings documents, the identified settings document including settings for a type of client requesting the configuration data; and
        requesting the identified settings document,
    wherein the settings comprise support log settings, support e-mail settings, and bandwidth settings,
    wherein the settings repository stores only the settings data,
    wherein the support log settings comprise a default setting to allow the client to activate a support log and a setting to disallow the client to activate the support log, and
    wherein the bandwidth settings comprise a maximum bandwidth setting and a minimum bandwidth setting.

2. The method of claim 1, wherein the requested configuration document from the settings repository provides the settings with name-value pairs.

3. The method of claim 1, wherein the requested configuration document from the settings repository includes settings for a plurality of different clients.

4. The method of claim 3, wherein the requested configuration document from the settings repository includes one of the following: administrative settings, user settings, security settings, security policies, and theme settings.

5. The method of claim 1, further comprising:
    based on the configuration document, requesting additional files from the settings repository; and
    receiving the additional files from the settings repository.

6. The method of claim 5, wherein the additional files include an image file identified in the configuration document.

7. The method of claim 1, further comprising requesting and receiving all files stored in the settings repository.

8. The method of claim 1, further comprising:
    identifying a document repository from the data repository information; and
    requesting documents from the identified document repository.

9. A system, comprising:
    a data storage including a document repository and a settings repository dedicated to providing settings data, the settings repository including files providing configuration data for one or more clients, wherein the data storage is a document management system that manages corporate data and tracks and stores electronic documents;
    a communication interface coupling the data storage to the one or more clients; and
    a processor, the processor operable to:
        receive a request for information to determine if there are repositories present on a data storage device;
        in response to the request for the data storage information, send the data storage information to the client, the data storage information including information to determine which repository is the settings repository;
        receive a request for client configuration data stored in the settings repository, the configuration data comprising settings for the client, wherein the configuration data includes a minimum version and a recommended version;
in response to the request for the client configuration data stored in the settings repository, send requested client configuration data stored in the settings repository to the client;
compare the version of the client with a version of the received configuration file;
require the client, if the client has a lower version than the minimum version, to upgrade the client version to at least the minimum version; and
notify the client, if the client has a lower version than the recommended version, with a recommendation to upgrade the client versions to the recommended version;
wherein the client is one of the following types: mobile operating system, desktop client, and web client, wherein each type of the client is associated with a different configuration file,
wherein the settings comprise support log settings, support e-mail settings, and bandwidth settings,
wherein the settings repository stores only the settings data,
wherein the support log settings comprise a default setting to allow the client to activate a support log and a setting to disallow the client to activate the support log, and
wherein the bandwidth settings comprise a maximum bandwidth setting and a minimum bandwidth setting.

10. The system of claim 9, wherein the requested configuration data includes a document with settings for one or more clients provided with name-value pairs.

11. The system of claim 9, wherein the requested configuration data includes a single document with the settings provided for a plurality of different clients.

12. The system of claim 11, wherein the clients include web-based clients, desktop clients and mobile clients.

13. The system of claim 9, wherein in response to the request for the client configuration data stored in the settings repository, sending all of the data stored in the settings repository to the client.

14. The system of claim 9, wherein in response to the request for the client configuration data stored in the settings repository, sending only files stored in the settings repository with content that has changed since a previous request for the client configuration data.

15. The system of claim 9, wherein the settings repository stores a document providing settings for one or more clients, and stores additional files for configuring the client, the additional files including at least one image file.

16. The system of claim 9, wherein the configuration data includes a document with the settings for the clients and the processor is further operable to provide a user interface to edit the settings in the document.

17. The system of claim 9, wherein the processor is further operable to:
receive a request for data stored in the document repository; and
in response to the request for data stored in the document repository, send requested data stored in the document repository to the client.

18. A non-transitory computer readable medium containing program instructions, wherein execution of the program instructions by one or more processors of a computer system causes one or more processors to perform operations comprising:
sending a request for information to determine if there are repositories present on a data storage device, wherein the data storage device is a document management system that manages corporate data and tracks and stores electronic documents;
receiving the data repository information, the data repository information including a directory of at least a portion of the data stored in the data repository;
determining which repository is a settings repository dedicated to providing settings data;
requesting configuration data from a settings repository, the configuration data comprising settings for the client;
receiving the configuration data from the settings repository, the configuration data including a document with settings for web-based clients, desktop clients and mobile clients, and the settings provided as name-value pairs, wherein the configuration document includes a minimum version and a recommended version;
based on the configuration data, requesting additional files from the settings repository, wherein the additional files includes at least one image file;
receiving the additional files from the settings repository;
storing the received configuration data and the additional files in memory associated with a client requesting the configuration data;
applying the settings defined in the configuration data to the client;
comparing the version of the client with a version of the received configuration file;
requiring the client, if the client has a lower version than the minimum version, to upgrade the client version to at least the minimum version; and
notifying the client, if the client has a lower version than the recommended version, with a recommendation to upgrade the client versions to the recommended version;
wherein the client is one of the following types: mobile operating system, desktop client, and web client, and wherein each type of the client is associated with a different configuration file, and wherein the settings comprise support log settings, support e-mail settings, and bandwidth settings,
wherein the settings repository stores only the settings data,
wherein the support log settings comprise a default setting to allow the client to activate a support log and a setting to disallow the client to activate the support log, and
wherein the bandwidth settings comprise a maximum bandwidth setting and a minimum bandwidth setting.

19. The method of claim 1, wherein the support e-mail settings comprise an e-mail address to which to send support requests.

* * * * *